Patented Aug. 10, 1926.

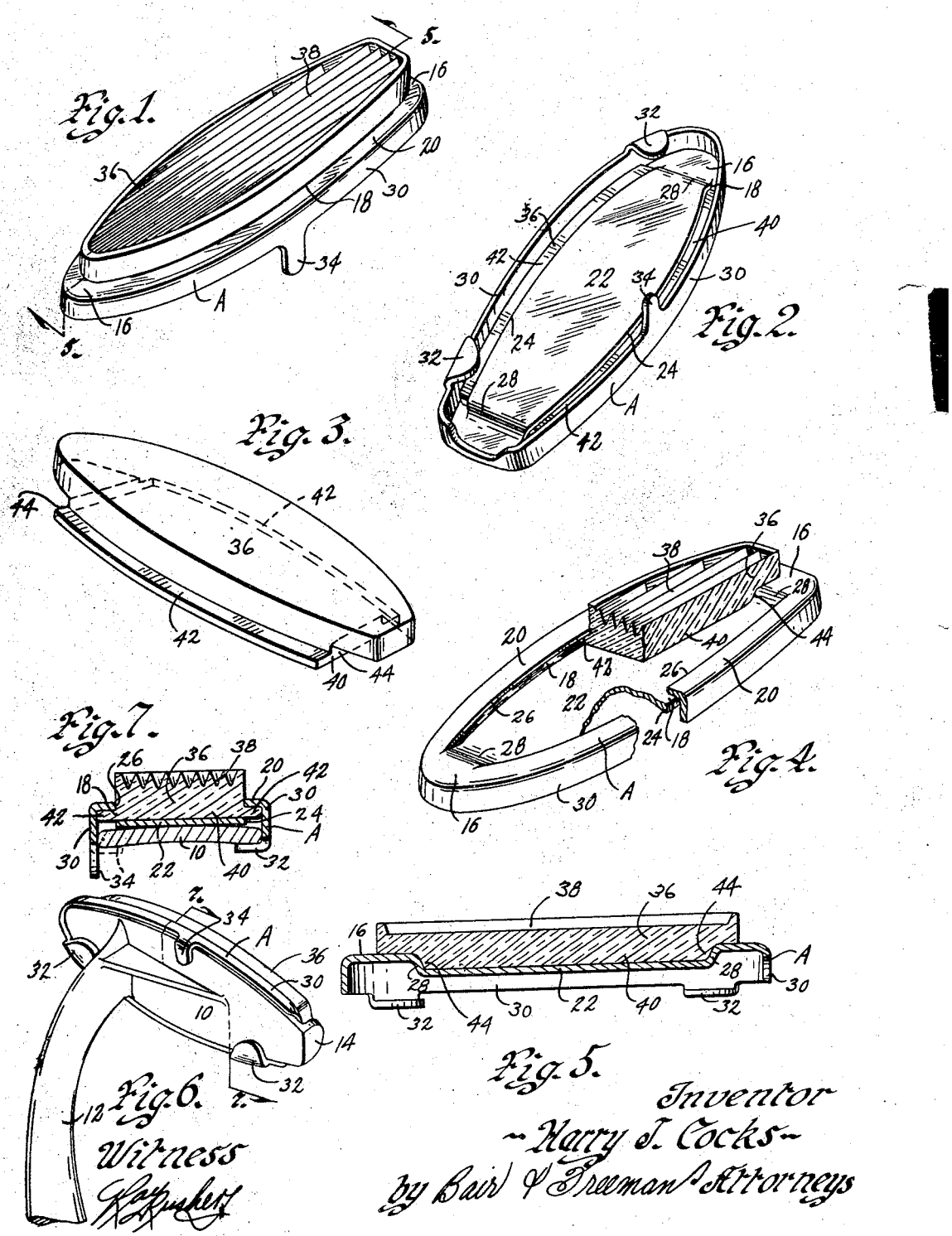

1,595,710

UNITED STATES PATENT OFFICE.

HARRY J. COCKS, OF DES MOINES, IOWA, ASSIGNOR TO METAL PRODUCTS COMPANY, OF DES MOINES, IOWA.

PEDAL PAD.

Application filed June 28, 1926. Serial No. 119,085.

My invention relates to a pedal pad for use upon foot pedals of automobiles.

More particularly my invention has to do with a metal frame and a rubber pad constituting the pedal pad which is adapted to extend over the head of a foot pedal and be secured thereto, the frame holding the rubber pad in position.

Still a further object is to provide a pad holding and foot pedal engaging metal frame adapted to be formed from sheet metal by stamping out of a single piece of material, the frame having its upper surface formed with a pair of spaced slits which form openings when the material between the slits is depressed, the openings receiving a portion of a pad for tightly holding it assembled on the frame, the frame itself having means to engage a foot pedal for holding it on a foot pedal.

Still a further object is to provide a pedal pad frame having a depressed bottom with two of the sides formed by the depressed bottom open for receiving flanges of the pad therein between the edges of the material of the frame for thus holding the pad secure upon the frame and within the depression formed therein.

Still a further object is to provide a pedal pad holding frame formed of a single piece of metal arranged to have its upper surface depressed with two of the sides formed by the depressing of the upper surface being open and the other two sides defining shoulders with a resilient pad received within the depression and having side flanges adapted to extend through the two openings and having shoulders near the ends of the flanges adapted to conform to and rest against the shoulders of the frame, the openings holding the pad on the frame and the shoulders of the frame preventing any endwise movement of the pad, a portion of the pad projecting up above the upper surface of the frame for preventing any crosswise movement of the pad relative to the frame.

Still a further object is to provide extensions on each side of the frame for engaging the foot pedal and anchoring the frame thereon, the extensions on one of the sides being preformed for hooking over the foot pedal and the extension on the other side being bendable for engaging the foot pedal after the frame has been mounted thereon.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my foot pedal pad assembly.

Figure 2 is a perspective view of the under side of the same.

Figure 3 is a perspective view of the rubber pad forming a part of the foot pedal pad.

Figure 4 is a perspective view of the foot pedal pad frame and a portion of the pad shown in section and parts being broken away to better illustrate the construction.

Figure 5 is a sectional view taken on line 5—5 of Figure 1 illustrating the depressed bottom formed in the upper surface of the frame.

Figure 6 is a perspective view of a foot pedal with my foot pedal pad mounted thereon; and Figure 7 is a sectional view taken on line 7—7 of Figure 6.

In the accompanying drawings I have used the reference numeral 10 to indicate generally the head or foot rest of a foot pedal which is usually of cast iron and formed integral with the foot pedal shank 12.

The head 10 of the foot pedal is usually flat or slightly curved upon its upper surface and has one end formed with an upturned lug 14 commonly called a finder, for preventing the slipping of the foot endwise on the foot pedal.

My pedal pad includes a frame A formed of metal stampings and of a single piece of material. The frame A comprises an upper surface 16 having a pair of spaced slits 18 therein. The spaced slits 18 may be curved lengthwise so as to conform to the curvature of the frame A or upper surface 16. The curvature of the frame A is usually of such shape and design as to conform to the curvature or outline of the upper surface of the pedal head 10.

The space between the outer edge of the frame and the slits 18 form horizontal flanges 20. The material spanning the space between the two spaced slits 18 is depressed for forming a depressed bottom 22 in the upper surface 16. The depressing of the upper surface as illustrated in Figure 4 of the drawings causes the slits 18 to be opened. The opening of the slits 18 in turn spaces the material 24 and 26 at the edges of the slits 18 in spaced apart position. The ends of the depressed bottom 22 are integral with the upper surface 16 of the frame A and form shoulders 28.

The upper surface 16 has a peripheral downturned flange 30 which extends around the edge of the foot pedal head 10, the under surface of the depressed bottom 22 resting upon the upper surface of the head 10. The flange 30 upon one side is formed with a pair of spaced preformed inturned hooks or extensions 32. The preformed hooks 32 engage over one side edge of the head 10 of the foot pedal and on the opposite side of the flange 30 I provide a downwardly extending lug or extension 34. The extension 34 is bendable after the frame A has been positioned upon the head 10.

In Figure 7 of the drawings I have shown the preformed hooks 32 in engagement with the under surface of the head 10 and the extension 34 in position just before it is bent, the dotted lines in Figure 7 illustrating the extension 34 after it has been bent in position.

It will be noted that the bottom 22 rests upon the upper surface of the head 10 and that the flange 30 extends around and adjacent to the edges of the head 10, while the preformed hooks 32 and extension 34 complete the anchoring of the frame A upon the foot pedal 12.

The frame A when anchored upon a foot pedal head 10 may be tightened and when once mounted thereon will not shift or wear and all rattle or vibration of the parts be eliminated.

A pad or cushion 36, preferably formed of rubber or some other soft pliable material, is mounted upon the frame A.

I will now describe in detail the mounting of the pad 36 upon the frame A whereby it is held assembled upon the frame A.

The pad 36 includes a tread surface 38 which may be ribbed and grooved or formed with any other tread design. The general outline of the pad 36 is substantially the same as the frame A and the foot pedal head 10 except that it is slightly smaller as clearly illustrated in Figure 1 of the drawings.

A downwardly extending part or portion 40 is formed upon the under side of the pad 36 and this portion is received in the depression formed in the frame A and rests upon the bottom 22. The portion 40 in turn is formed of a pair of outwardly extending side flanges 42 which are designed to project through the slit openings 18. The flanges 42 tightly engage the edges 24 and 26 of the material forming the frame A. The major portion of the pad 36 projects up above the upper surface of the frame A.

The pads 36 are compressed somewhat before they are slid into the slit openings 18. After the flanges 42 are pressed in the slit openings 18 and the pad sets itself against the bottom 22, it is almost impossible to remove the pad from the frame.

The portion 40 of the pad 36 has shoulders 44 which are shaped to fit against the shoulders 28 on the frame A, as clearly shown in Figure 4 of the drawings. The portion of the pad 36 which projects up above the surface 16 of the frame A projects out beyond the shoulders 44 and simply rest upon the upper surface 16. The shoulders 44 abutting against the shoulders 28 prevents any endwise movement of the pad relative to the frame A. The crosswise movement of the pad 36 relative to the frame A is prevented by the slit openings 18 and the upper material edge 26. The pad 36 when once assembled upon the frame A is held thereon and the entire foot pedal pad may then be mounted upon the head 10 of a foot pedal as a unit. Should the rubber cushion become worn and loose in its frame, it will in no way cause the frame A to become loose relative to the foot pedal because the frame A is held upon the foot pedal independently of the pad 36.

The advantage of my foot pedal pad is of course apparent from the description and it will be noted that the pad 36 is so formed that it may be securely fastened to the frame and cooperates with portions of the frame so that when once assembled, the frame and pad may be dealt with as a single unit.

Some changes may be made in the details of structure and arrangement of parts, without avoiding the real invention involved, and it is my purpose to cover by my claims any such changes or modifications as may be within the real scope of my invention.

I claim as my invention:

1. A pedal pad comprising a pad holding and foot pedal engaging frame, said frame having spaced slits, the material of the frame between said slits being depressed whereby said slits form openings, a pad mounted on said frame having a portion extending into the depression formed in said frame, flanges on said portion of the pad adapted to extend through said openings for constituting means for holding the pad on the frame.

2. A pedal pad comprising a pad holding and foot pedal engaging frame, said frame having spaced slits, the material of the frame between said slits being depressed whereby said slits form openings, a pad mounted on said frame having a portion extending into the depression formed in said frame, flanges on said portion of the pad adapted to extend through said openings for constituting means for holding the pad on the frame, integral extensions on said frame for anchoring the frame on a foot pedal.

3. A pedal pad comprising a pad holding and foot pedal engaging frame, said frame having spaced slits, the material of the frame between said slits being depressed whereby said slits form openings, a pad mounted on said frame having a portion extending into the depression formed in said frame, flanges on said portion of the pad adapted to extend through said openings for constituting means for holding the pad on the frame, preformed hook extensions on said frame for engaging one side of the foot pedal and a bendable extension for engaging the other side of the foot pedal.

4. A pedal pad including a frame having a depressed bottom, two of the side walls of said frame formed by the depressed bottom being open, a pad mounted on said frame having a portion resting on said bottom, side flanges on said portion adapted to project through said open sides for constituting means for holding the pad to the frame.

5. A pedal pad including a frame having a depressed bottom, two of the side walls of said frame formed by the depressed bottom being open, a pad mounted on said frame having a portion resting on said bottom, side flanges on said portion adapted to project through said open sides for constituting means for holding the pad to the frame, preformed inturned extensions on one side of said frame and a downwardly extending bendable extension on the other side of said frame.

6. A pedal pad comprising a pad holding and foot pedal engaging frame, said frame having spaced slits, the material of the frame between said slits being depressed whereby the edges of each of said slits are vertically spaced apart defining thereby open slits, a pad mounted on said frame having a portion extending into the depression between said slits, a part of said portion projecting through the open slits and tightly engaging the spaced edges of said slits whereby the pad is held assembled on said frame.

7. A foot pedal pad comprising a pad holding frame, the upper surface of said frame having spaced slits therein, the material of the frame spanning the space between said slits being depressed for opening said slits and spacing the material of the frame at the edges of said slits, a pad on said frame having a portion resting on the material spanning the distance between said slits, a part of said portion projecting through the open slits and tightly engaging the material of the frame at the edges of the slits for holding the pad assembled on the frame, a downwardly extending flange on said frame for encircling the foot pedal and extensions on the free edge of said flange for anchoring the frame on the foot pedal.

8. A device of the class described comprising a pad supporting frame having slits in the surface thereof marginally spaced from the sides of said frame, the material of the surface of said frame between said slits being depressed for opening the slits and for forming shoulders adjacent the ends of said frame, a pad having portions resting on the surface of said frame adjacent said shoulders, a portion of said pad fitting between the open slits and the shoulders and resting on the depressed portion of the surface, flanges on the last mentioned portion of said pad extending through the open slits for securely holding the pad in position on the frame.

HARRY J. COCKS.